(No Model.)  2 Sheets—Sheet 1.
T. GRISWOLD, Jr.
CLUTCH MECHANISM.
No. 491,169. Patented Feb. 7, 1893.
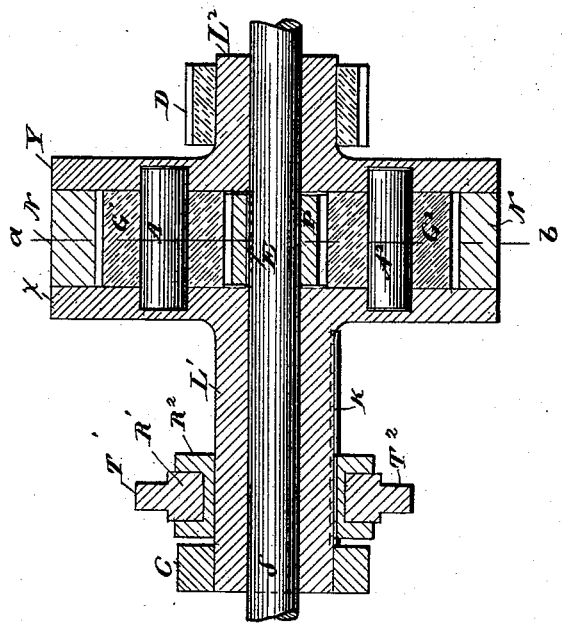
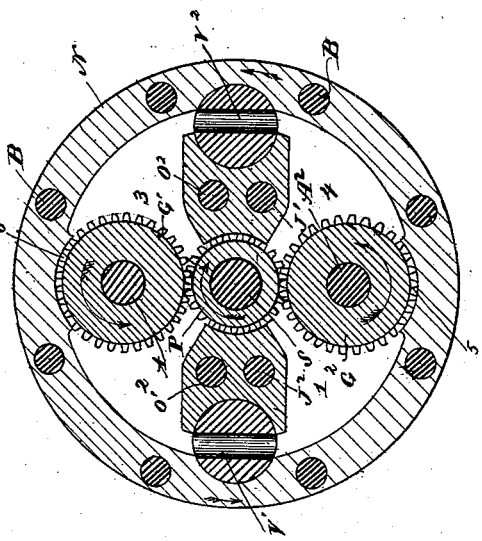
Witnesses
Chas H Parsons
[signature]
Inventor,
Thos Griswold Jr.
by George C. Wing
his Attorney (No Model.) 2 Sheets—Sheet 2.
T. GRISWOLD, Jr.
CLUTCH MECHANISM.
No. 491,169. Patented Feb. 7, 1893.
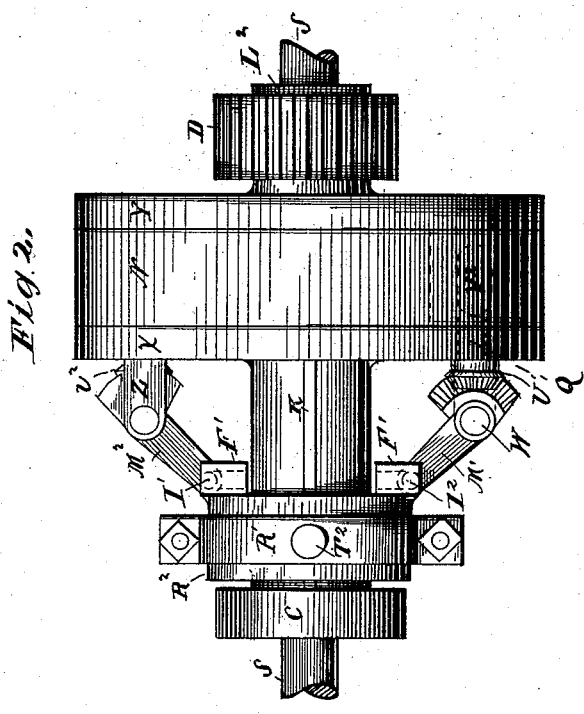
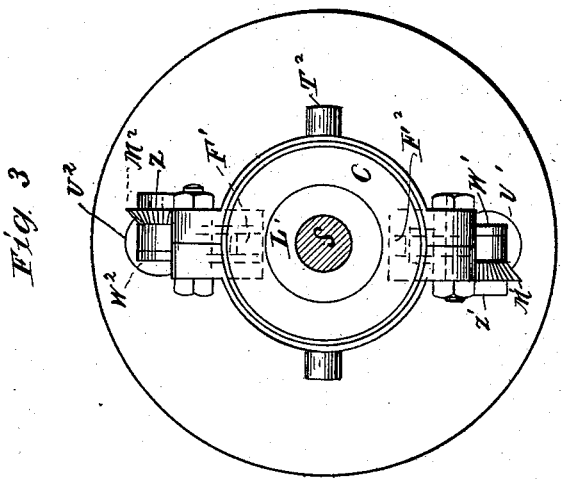
Witnesses
Chas. H. Parsons
Chas. H. Elmers
Inventor
Thos. Griswold Jr.
by George C. Wing
his Attorney

UNITED STATES PATENT OFFICE.

THOMAS GRISWOLD, JR., OF CLEVELAND, OHIO.

CLUTCH MECHANISM.

SPECIFICATION forming part of Letters Patent No. 491,169, dated February 7, 1893.

Application filed May 21, 1892. Serial No. 433,918. (No model.)

*To all whom it may concern:*

Be it known that I, THOMAS GRISWOLD, Jr., a citizen of the United States, residing at Cleveland, in the county of Cuyahoga and State of Ohio, have invented a new and useful Improvement in Clutch Mechanisms, of which the following is a specification.

My invention relates to that class of improvements in the mechanisms specified wherein a hollow, or cored wheel, is provided with internal gearing to and with a subordinate fast wheel, or pinion, upon a common shaft, which said gearing operates within interior chambers in said wheel, containing oil, or other suitable fluid, to circulate the said fluid, without resistance, when said chambers are thrown open—one to the other—but which is at once resisted by the said fluid—and to a degree to completely lock said hollow wheel to the said fast pinion, and thereby effect the driving action desired whenever the said fluid chambers are closed. Furthermore, by my said mechanism, the pace, or speed of the driven part may be brought to and retained at any rate desired between the extremes of motion for which a given mechanical aggregation is capable, and may also be varied as frequently and as gradually, or abruptly, as the conditions, at the moment, require; and the object and end to be attained by my invention may be said to be to provide a fluid clutch, or clutch operating within—and in connection with, oil or other appropriate fluid, whereby the resistance of said fluid, when under a full, or partial confinement, is utilized to effect a corresponding degree of resistance between the rotating shaft and the otherwise free driving wheel. I accomplish my said objects by the mechanism illustrated in the accompanying drawings, wherein—

Figure 1 is a vertical section of the entire machine; Fig. 2 is a view of the same complete and as if rotated upon its shaft upwardly ninety degrees from the position it is represented as occupying in Fig. 1; Fig. 3 is an end view, and Fig. 4 is a transverse vertical sectional view of the device, shown in Fig. 1, through the line $a$, $b$, therein.

Throughout the said views similar letters and figures are employed to designate similar parts respectively.

In the several drawings S indicates the main shaft upon which is mounted a pinion P, securely keyed against rotary motion thereabout, by the feather, or key, E, but is permitted, if preferred, a short sliding range, longitudinally, in its keyway upon the shaft.

Upon either side of the pinion P, is a side, or cheek plate X, and Y, respectively, in close operative juxtaposition to the ends, or sides, of said pinion, and free to turn upon the shaft S. The said side plates are each provided with hubs ($L'$ and $L^2$,) for the main purposes to be hereinafter more fully pointed out, the hub $L'$—as will be observed—being especially prolonged, or extended into a sleeve—as compared with its companion hub $L^2$.

Between the side plates X and Y, and securely held in its position by the bolts, as indicated by B. B. (Fig. 4), is a band or ring of metal, or other suitable material, N, slightly exceeding in width; and concentrically surrounding the pinion P, and thereby completing, about the same, a circular inclosed case which is itself free to revolve around the shaft S independently of any immediate connection with the said pinion.

Journaled in the side-plates X and Y, upon the shafts A and $A^2$, are two gears $G'$ and $G^2$, which are of the same width as, and mesh into the pinion P, upon opposite sides thereof, and which have diameters of a proper proportion to bring their peripheral surfaces—when said gears are in position for action—into as close proximity to the band N as is consistent with a due revolution upon the said axles. It will be found that a more efficient operation of my said clutch will be secured, if the band—or ring N—is somewhat cut away across the same, (as shown at 5 and 6 in Fig. 4) in order to thereby obtain a partial sheathing for the said gears.

Upon opposite sides of the center pinion P, and midway between the gears $G'$ and $G^2$ are two partitions $J'$ $J^2$ connecting the peripheral and lateral interior surfaces of the said inclosed case—and which respectively approach the pinion P, parallel with its axis, and along its entire width, to as intimate a degree as is consistent with the free movement of the latter about its said axis. It will likewise be found preferable—as in the adjustment hereinbefore recommended of the gears G' and G², in their relations with the band N—to slightly cut away the said partitions at the points O' and O² (Fig. 4) where they so approach the said pinion in order to secure a partial sheathing for the same.

V' and V² are valves communicating, respectively, between the interior chambers of the said inclosed case marked 1 and 2, and 3 and 4, in Fig. 4. In said Fig. 4 said valves are represented as located between the partitions J', J² and the band N. Nor is it an essential requirement that the said partitions, or the several trains of gears with the said central pinion P, should be so constructed as to, in every instance, divide the said circular inclosed case into a number of equal and exactly similar chambers such, for instance, as appear in the apartments designated 1, 2, 3, and 4, in Fig. 4. Obviously the principle of my invention in no degree depends upon the relative proportion or volume capacity of these chambers. All the unoccupied space within the said circular inclosed case—including the several chambers 1, 2, 3, 4, is filled with oil, glycerine, or other suitable fluid.

Upon the prolonged hub, or sleeve L', of the side plate X is mounted a scored ring R², fitting the hub, or sleeve, loosely and adapted to slide on the fast feather K, in the same, but, to be thereby compelled to rotate upon and with the said hub or sleeve. L'. Fitting loosely in the score of the ring R² is another ring R', having lugs T' and T², which engage with any convenient system of throw levers, or other appliance, to effect a lateral motion of the ring R'—and its seat R², along the sleeve L'. Upon opposite sides of the ring R², and in a plane coincident with the axis of the shaft S, and with the valves V' and V² (see Fig. 2), are two projections F' and F² containing radial grooves of sufficient dimensions to receive the guide pins I' and I², and permit the same to travel forward and back therein according as the levers M' and M² are moved. The said guide pins pass through the inner extremities of the said levers M' and M² at right angles to the same. The said levers M' and M² are carried upon the studs W' and W², and have their outer extremities fitted with segments of a beveled gear meshing into the beveled gears v' and v². The beveled gears v' and v² are fast to the projecting stems of the valves V' and V² of which one is indicated by the dotted lines at Q in Fig. 2.

C is a collar upon the sleeve, or hub, L', to limit the outward throw of the clutch ring R². The throw-levers—or other actuating apparatus of the clutch-ring R², it has not seemed necessary to represent in the several drawings. Any of the well known systems capable of moving the said clutch ring in the desired manner will answer the purpose.

D is the gear, or other wheel, keyed to the hub L² of the cheek plate Y, to be driven by the said circular case of which the cheek plate Y is a side.

In order to operate the device which I have hereinbefore described—and have illustrated in the drawings, as a practical embodiment of my said invention—it is to be first understood, of course, that the shaft S, upon which the device is mounted, as aforesaid, is adapted to be driven by apppropriate mechanical connections with the power source, and is in active rotation about its axis, in the direction indicated by the arrow on the pinion P, in Fig. 4. It is obvious that said pinion, being fast, as already stated, to the shaft S must rotate in the same direction and with a corresponding pace. It is further obvious that, when the valves V' and V² are open (as represented in Fig. 2), the said pinion, coacting, as it does, with the gears G' and G², will necessarily cause the latter to rotate at the same time upon their axles in the directions indicated by the arrows thereon. Under the conditions thus assumed, and appearing, it is evident that—by reason of their peculiar construction, and relative adjustment to each other and the several parts of the device—the double train of gearing, in its movement, as aforesaid, performs the functions of a rotary circulating pump to the oil, or other fluid body, with which the chambers of the said case are filled. As the teeth of the gear G' enter and pass by the partial sheathing at 6, their interdental spaces will, in succession, perform the office of buckets to carry the oil, within the chamber 3, over and into the adjacent chamber 2. Such influx of oil to the latter chamber is simultaneously counterbalanced and neutralized by the exactly similar operation of the gear G² in withdrawing, (at 5) in its inter-dental spaces, an equivalent volume of oil from the chamber 1, and depositing the same within the chamber 4. While, thus, the action of the two gears described, is to occasion a circulating current of the fluid contents of the clutch, a corresponding and subordinate current will be induced, by the rotating inter-dental spaces of the pinion P., from the chamber 3 to the chamber 4, on its one side, and, from the chamber 1 to the chamber 2 on its other. It is to be observed, however, that no oil, or practically none, will be carried from chamber to chamber through the points where the pinion and gears mesh—for the reason that the inter-dental spaces which are the efficient agents for the purpose at the other points, are here, of course, occupied by the meshing teeth. It is thus apparent that, while the valves V' and V² are open, a free and unimpeded revolution of the shaft S, and its pinion P, through the said inclosed case must occur, and that the latter will remain loose and idle in its place upon said revolving shaft and without, of course, during said conditions, imparting any power, or driving force, to the gear D. If now it is desired to clutch the said gear D to the revolving shaft, S, by my said mechanism, the ring R²—by means of its proper actuating device—is caused to slide laterally upon the sleeve L'—as heretofore described, toward the said clutch-case. The levers M' and M², turning upon their guide pins in the slots F' and F², are thereby brought to a position nearer at right angles to the shaft S—and, during the movement, will have caused the valves V' and V² to rotate—(by the action of the segmental gearing upon the projecting valve stems—) and become closed against the passage or circulation of the oil therethrough. By thus closing the said valves, the further escape—or removal, of oil from the chambers 2 and 4, (to counterpoise, or compensate for, the oil pumped therein from the chambers 1 and 3,) is arrested, and, a back-pressure, at once, results to the inflow of additional oil to said chambers 2 and 4, and, to a degree that, immediately, stays all independent revolutions of the gears G' and G²—upon their shafts A and A²—and compels them, instead, to circle about the pinion P, as a center, and, in this manner, to clutch, and carry around into the desired rotation with the shaft—the entire clutch case and its driven gear D.

Although, in the construction shown in the drawings, an operative device is depicted which employs but two gears, that has but two partitions J'. J², and that makes use of other details, and specific parts, of a naturally variable character, I do not intend to limit my invention to such parts in respect to their precise form or number.

What I claim as new and desire to secure by Letters Patent, is—

The combination, for the purpose specified, with a cogged wheel fast upon a shaft, of a hollow disk-shaped wheel mounted loosely thereon concentrically about said cogged wheel, partitions in said disk-shaped wheel radiating centrally from within a close operative proximity to the peripheral surface of the said cogged wheel; gear wheels upon opposite sides of said partitions, meshing with said cogged wheel and having their surfaces in close operative proximity with the interior surface of said hollow wheel; oil, or other suitable fluid in said hollow wheel between said partitions, there being orifices in said partitions, and means for opening and closing said orifices at will, substantially as shown and described.

In witness whereof I have hereunto set my hand this 30th day of April, 1892.

THOS. GRISWOLD, JR.

In presence of—
 M. MILLARD,
 E. A. BEALE.